(12) United States Patent
Abdo et al.

(10) Patent No.: US 9,110,626 B2
(45) Date of Patent: Aug. 18, 2015

(54) VIDEO DETECTION IN REMOTE DESKTOP PROTOCOLS

(75) Inventors: Nadim Abdo, Bellevue, WA (US); Tong L. Wynn, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 402 days.

(21) Appl. No.: 13/396,398

(22) Filed: Feb. 14, 2012

(65) Prior Publication Data

US 2013/0208785 A1  Aug. 15, 2013

(51) Int. Cl.
*H04N 7/26* (2006.01)
*G06F 3/14* (2006.01)
*H04L 29/08* (2006.01)
*H04N 19/176* (2014.01)
*H04N 19/132* (2014.01)
*H04N 19/137* (2014.01)

(52) U.S. Cl.
CPC .............. *G06F 3/1454* (2013.01); *H04L 67/36* (2013.01); *H04N 19/132* (2014.11); *H04N 19/137* (2014.11); *H04N 19/176* (2014.11); *G09G 2320/103* (2013.01); *G09G 2350/00* (2013.01)

(58) Field of Classification Search
None
See application file for complete search history.

(56) References Cited

U.S. PATENT DOCUMENTS

| | | | |
|---|---|---|---|
| 6,304,606 B1 | 10/2001 | Murashita et al. | |
| 7,817,157 B2 | 10/2010 | Emerson et al. | |
| 2005/0025361 A1 | 2/2005 | Gadre et al. | |
| 2007/0160288 A1 | 7/2007 | Hoffman et al. | |
| 2009/0183085 A1 | 7/2009 | Pasetto et al. | |
| 2010/0111180 A1 | 5/2010 | Gao et al. | |
| 2010/0195733 A1 | 8/2010 | Yan et al. | |
| 2010/0303146 A1 | 12/2010 | Kamay | |
| 2011/0032982 A1 | 2/2011 | Costa et al. | |
| 2011/0141133 A1* | 6/2011 | Sankuratri et al. | 345/600 |
| 2011/0150433 A1 | 6/2011 | Alexandrov et al. | |
| 2011/0258339 A1* | 10/2011 | Matsui et al. | 709/236 |
| 2012/0050298 A1* | 3/2012 | Abdo | 345/501 |

OTHER PUBLICATIONS

PCT Application PCT/US2013/024688, International Search Report mailed May 16, 2013, 9 pages.
Imai, et al., "An Adaptive Desktop Transfer Protocol for Mobile Thin Client", GLOBECOM Workshops, 2010 IEEE, Dec. 6-10, 2010, pp. 1136-1140.
Shen, et al., "A High-Performance Remote Computing Platform", IEEE International Conference on Pervasive Computing and Communications, 2009, pp. 1-6.
Baratto, et al., "THINC: A Virtual Display Architecture for Thin Client Computing", Proceedings of the 20th ACM Symposium on Operating Systems Principles, 2005, vol. 39, Issue 5, pp. 277-290.

* cited by examiner

*Primary Examiner* — Sath V Perungavoor
*Assistant Examiner* — Janese Duley
(74) *Attorney, Agent, or Firm* — Bryan Webster; Kate Drakos; Micky Minhas

(57) ABSTRACT

A display area having rendered data thereon is divided into a plurality of tiles and an update frequency for each tile is determined. A determination is then made as to whether the update frequency of each tile exceeds a threshold. For each tile whose update frequency exceeds the threshold, that tile is marked as a candidate tile. Adjacent candidate tiles are then associated to form a heat map. The heat map is then analyzed to determine whether to encode the rendered data associated with the heat map.

20 Claims, 8 Drawing Sheets

VIDEO DETECTION IN REMOTE DESKTOP PROTOCOLS

BACKGROUND

In various remote desktop situations, certain data is encoded prior to being sent to a remote client in order to decrease bandwidth requirements for transmitting the data. However, it is difficult to ascertain which data should be encoded prior to transmitting and which data does not need to be encoded. It is with respect to these and other considerations that the present embodiments have been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide for dividing a display area having rendered data thereon into a plurality of tiles and determining an update frequency for each tile. A determination is then made as to whether the update frequency of each tile exceeds a threshold. For each tile whose update frequency exceeds the threshold, that tile is marked as a candidate tile. Each of the adjacent candidate tiles are then associated to form a heat map. The heat map is then analyzed to determine whether to encode the rendered data associated with the heat map.

Embodiments disclosed herein may be implemented as a computer process, a computing system or as an article of manufacture such as a computer program product or computer readable media. The computer program product may be computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Further features, aspects, and advantages will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
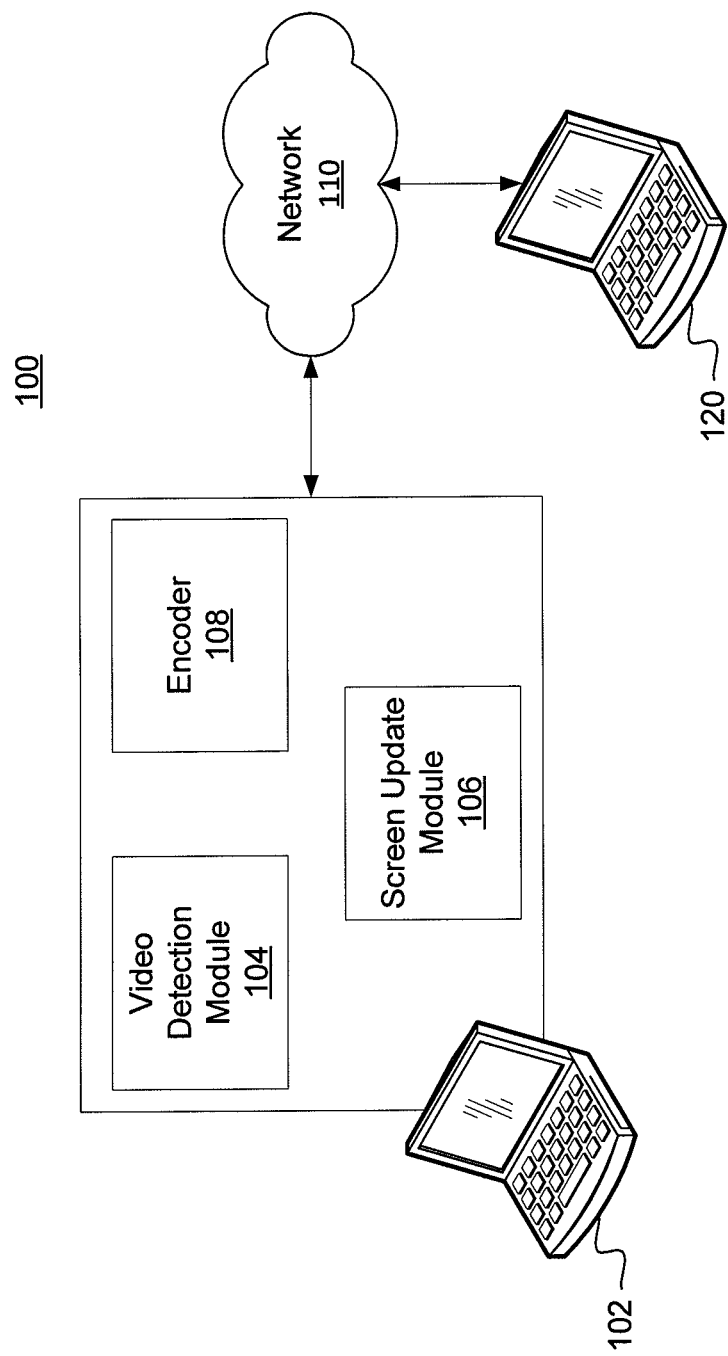
FIG. 1 illustrates a system for detecting video content according to one or more embodiments.

FIG. 1 illustrates one embodiment of a system 100 including a remote desktop host 102 for detecting video content according to one or more embodiments. As shown in FIG. 1, the system 100 also includes remote desktop client 120 that is in communication with the remote desktop host 102 via a network connection 110. In certain embodiments, the remote desktop host 102 may be a server and the remote desktop client 120 may be a personal computer, a laptop computer, a tablet computer, a mobile phone and the like.

In certain embodiments, the remote desktop client 120 includes a video detection module 104, screen update module 106 and an encoder 108. Although only one encoder 108 is shown, it is contemplated that multiple encoders may be used by the remote desktop client 120 to encode video data or other data prior to the video data being sent to the remote desktop client 120.

In embodiments, the remote desktop host 102 receives video data or other visual data as input. The video and visual data may be processed by a central processing unit of the remote desktop computer. Once the data is received, the central processing unit of the remote desktop host 102 may cause the video data and visual data to be rendered on a display area. In certain embodiments, a screen update module 106 communicatively coupled with the processor may cause the video data and the visual data to be rendered on a display area of the remote desktop host 102. Additionally, the video detection module 104 may be configured to determine which portions of the rendered data is video data and which portions of the rendered data is visual data (e.g. fixed images). As will be discussed in detail below, once the video detection module 104 determines which portions of the rendered data is video data, the video data may be encoded using an encoder 108. Once the data is encoded, the encoded data may be transmitted to the remote desktop client 120 via the network connection 110.

In certain embodiments, the encoder 108 uses the H.264 encoding standard although other encoding standards may be used. It is also contemplated that the encoder 108, or another encoder (not shown), may be used to encode the visual data using a separate encoding standard to further reduce bandwidth requirements as the visual data and video data are transmitted to the remote desktop client 120.

In certain embodiments, the video data may include video data that is stored locally on the remote desktop client 120, video data that is stored on an external storage service (not shown) such as a cloud storage service, or video data that is downloaded or streamed from another server (not shown) or client device (not shown). While video data is primarily discussed, the methods disclosed herein may be used on any form of content, video or otherwise, that maintains a constant rate of change for at least a predefined period of time.

Referring back to FIG. 1, in certain embodiments, the screen update module 106 may be configured to forward the visual data, such as, for example, text, graphical objects, or fixed images, from the remote desktop host 102 to the remote desktop client 120. Likewise, the encoder 108 may be configured to transmit the encoded video data to the remote desktop client 120. As discussed above, the visual data may also be encoded using a particular encoding standard. However, as the visual data may be updated less frequently in comparison to the video data, the visual data may not be required to be encoded prior to being transmitted to the remote desktop client 120. In certain embodiments, treating the visual data differently from the video data may not overly consume resources by needlessly encoding data that does not need to be encoded. Likewise, when the video data is identified separately from the visual data, efficient codecs that are specially designed to encode video may be used on the video data to achieve a better compression ratio and a lower bitrate.

In embodiments, the video detection module 104 may be configured to identify video content based on a variety of criteria, such as, for example, an update frequency of an area, pixel or frame associated with video data, an aspect ratio of the video data, a class name for a window in which the video data is being rendered, a process name for a screen update associated with the video data and the like. Additionally, the video detection module 104 may be configured to detect if the video has stopped playing or whether the video data has been moved from a first position in the display area to a second position of the display area.

As will be discussed in greater detail below, the video detection module 104 is configured to detect which portions of the rendered data is video data. In certain embodiments, the video detection module is configured to divide a display area into a grid of sub-sections referred to herein as tiles. One skilled in the art will appreciate that a tile is a predetermined portion of the entire display area. In certain embodiments, the size of each tile of the grid may be set at a predetermined size. For example, each of the tiles in the grid may be 32×32 pixels, 64×64 pixels or the like. As the display area is updated, using for example the screen update module 106, the video detection module receives a bitmap associated with each update. In certain embodiments, the bitmap includes an indication as to which pixels in the bitmap have been updated. For example, the bitmap may identify which pixels in the bitmap have been updated by keeping a list of updated triangles associated with each update. In certain embodiments, groups of pixels (i.e., regions) are monitored. In such embodiments, the video detection module 104 compares each region in consecutive bitmaps to determine which regions have changed.

If a particular tile intersects one of the changed regions in the bitmap, the video detection module 104 increments a count associated with that particular tile. In certain embodiments, the video detection module 104 continues to monitor each of the regions (e.g., monitors the region per frame) to determine an overall update frequency for each of the tiles. If the overall update frequency (e.g., number of updates per second) exceeds an update frequency threshold, the tile is marked as a potential video candidate.

Once all potential video candidate tiles have been identified, adjacent candidate tiles are associated to form a representation of tiles that are believed to be able to render video. Such a representation is referred to herein as a "heat map". The heat map may be used to identify one or more potential video regions (e.g., tiles on the display that are actively rendering video data). The video detection module 104 then monitors the heat map over a predetermined amount of time (e.g., 20 frames) to determine whether the tiles of the heat map stay "hot" (e.g., whether each tile in the heat map is continuously being updated).

When it is determined that the heat map has identified video data, the encoder 108 encodes the video data and the encoded video data is transmitted to the remote desktop client 120. In certain embodiments, the encoded video data is transmitted to the remote desktop client 120 along with the visual data. Once the encoded video data is received, the remote desktop client 120 may decode the video data to render the video data, along with the visual data, on a display of the remote desktop client 120.

In certain embodiments, the video detection module may track the coordinates of the heat map each time a bitmap is received. Accordingly, the video detection module 104 may be able to determine when video data has been moved to a different position on the display area and as a result, the video detection module 104 will no longer cause the tiles in the heat map to be encoded by the encoder 108. For example, the video detection module 104 may be configured to check the coordinates of a heat map over consecutive frames of the video data. If the coordinates of one or more consecutive heat maps do not match, the video detection module may determine that the video data has been moved. As a result, the encoding of that data represented by the heat map is stopped until a new heat map is detected as set forth above.

Figure 2:
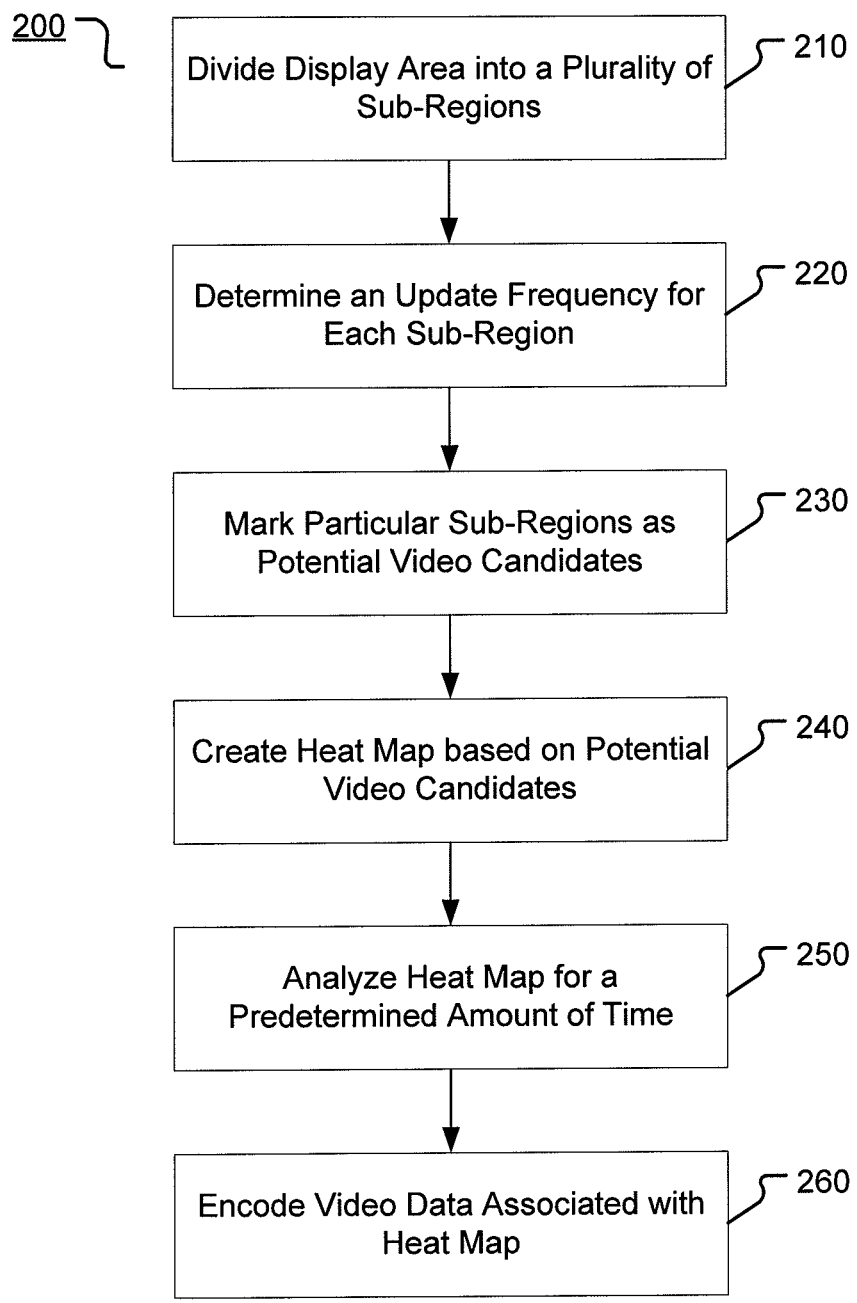
FIG. 2 is a block diagram showing the operation flow for detecting video content according to one or more embodiments.

FIG. 2 illustrates a method 200 for detecting video content according to one or more embodiments. In certain embodiments, one or more components of a system, such as system 100 (FIG. 1), may employ the method 200 to detect whether video content is being rendered on a display area of a remote desktop host in order to cause the rendered data in those display areas to be encoded prior to transmitting the rendered data to a remote desktop client.

Method 200 begins at operation 210 in which a display area that is rendering video data and/or visual data is divided into a plurality of tiles. In certain embodiments, the video data and the visual data are rendered on a display area associated with a remote desktop host, a server, or other such computing device. It is contemplated that video data and visual data may be rendered on a display area simultaneously. For example, the visual data may occupy a first portion of the display area while the video data may occupy a second portion of the display area. It is also contemplated that at certain times, the display area may not contain any video data. In such cases, the display area is still divided as discussed above so that detection of the video data, when rendered, can commence with little or no delay.

Figure 3:
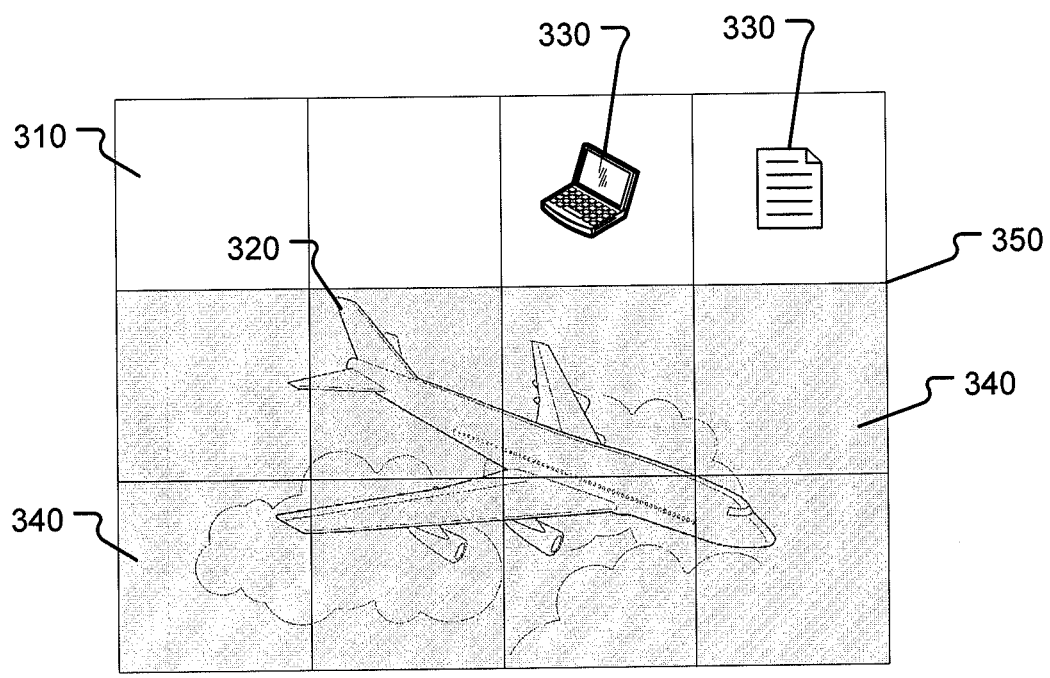
FIG. 3 illustrates exemplary video data with an associated heat map according to one or more embodiments.

Referring to FIG. 3, a display area 300 is shown that is sub-divided into a plurality of tiles 310. The display area may be a desktop display of a particular operating system or an application being executed by the operating system. As shown in FIG. 3, the display area 300 may include rendered video data 320 (e.g., an airplane flying through the sky) as well as rendered visual data 330 (e.g., some icons). Additionally, it is contemplated that each separate tile may contain visual data 320 while other tiles (e.g., tiles 340) contain video data. Although not shown, it is also contemplated that one or more tiles may contain both visual data and video data.

In certain embodiments, each of the tiles of the display area has a predetermined size. For example, each of the tiles may be 32×32 pixels, 64×64 pixels etc. Although specific sizes have been given, it is contemplated that the size of each tile may differ. It is also contemplated that a first tile may have a first size while a second tile has a second, different size. For example, if one particular area (made up of a plurality of tiles) of the display area has not had video data rendered thereon for a given amount of time, each of the various tiles in that area may be combined to create a joint tile until video content is detected in at least a portion of the joint tile. Once video content is detected in that joint tile, the joint tile may be re-divided back into the original tiles to enable detection of which of the original tiles contains the video data. Once the tiles have been re-divided, the method proceeds as set forth below.

Referring back to FIG. 2, once the display area has been divided into a plurality of tiles, flow proceeds to operation 220 in which an update frequency for each tile is detected. In certain embodiments, a bitmap is received each time (e.g., every frame) the display area is updated. Additionally, each bitmap contains information about which pixels in the bitmap have been updated. In another embodiment, two or more consecutive bitmaps may be compared against one another to determine which pixels in the bitmap have been updated. In still yet other embodiments, groups of pixels (i.e., regions) may be monitored to determine which regions have been updated. In certain embodiments, each of the pixels of the bitmap or each region in the bitmap is associated with a particular tile of the display area. If a region or pixel of the bitmap has changed, an update count associated with the tile is incremented.

In certain embodiments, each tile is monitored for a predetermined amount of time in order to determine whether an update frequency associated with the tile exceeds an update frequency threshold. For example, if the number of updates per second (e.g., the update count is incremented over a predetermined number of times per second) exceeds a threshold, that particular tile is marked 230 as a potential video candidate. For example, referring back to FIG. 3, the shaded tiles 340 are those tiles that have an update frequency above a threshold rate. As such, the shaded tiles 340 are marked as potentially having video data being rendered therein.

In certain embodiments, in order for a tile to be marked as a potential video candidate, the update frequency for that tile must exceed the update frequency threshold for a predetermined amount of time. The predetermined amount of time may be equivalent to an elapsed period of time (e.g., 2 seconds) or based on a number of frames (e.g., 20 frames). If the update frequency of the tile does not exceed the update frequency threshold for the predetermined amount of time (e.g., in a first frame the tile is "hot" and in the next frame the tile is not "hot") that particular tile is not a potential video candidate.

Although an update frequency is specifically mentioned, it is also contemplated that a particular tile may be identified as a potential video candidate when a change in a pixel or region associated with the tile is identified. Once marked, the tile may be associated with other adjacent marked tiles to form a heat map such as discussed below. In such embodiments, the heat map as a whole is then analyzed as set forth in operation 250.

Referring back to FIG. 2, flow then proceeds to operation 240 in which a heat map is created based on the tiles that are marked as potential video candidates. In certain embodiments, adjacent "hot" tiles (e.g., those tiles that are identified as potential video candidates) in each frame are associated to form the heat map. For example, with reference to FIG. 3, the shaded tiles 340 that are adjacent to one another are associated to form the heat map 350. Although a single heat map 350 is shown in FIG. 3, it is contemplated that two or more heat maps may be detected on the display area simultaneously or substantially simultaneously. In such cases, each of the heat maps will be analyzed and encoded as needed as will be discussed below.

Once the heat map has been generated, the heat map is analyzed 250 for a predetermined amount of time in order to determine if the heat map as a whole represents potential video data that should be encoded. In certain embodiments, a history of the heat map is maintained to determine whether the heat map remains "hot" for a predetermined amount of time. For example, if the heat map remains "hot" for two seconds or for 20 consecutive frames, the data associated with the heat map is identified as video data and is subsequently encoded 260.

In certain embodiments, the data associated with the heat map may continue to be encoded until the heat map is no longer "hot" for a second predetermined amount of time (e.g., 1 second or 5 consecutive frames). Once it is determined that the heat map is no longer "hot", the encoding of the video data is stopped.

As discussed above, in situations where the video data has been moved on the display area (e.g., to different coordinates), the particular heat map associated with the video data will no longer be "hot." As such, the data associated with that heat map will no longer be encoded. However, if the video data is still being rendered on the display area, just in a different spot, the detection of a new heat map will proceed as set forth above.

In alternative embodiments, each frame of rendered video data may be provided by a graphics processing unit (GPU) instead of a general purpose central processing unit (CPU). In such instances, each bitmap is generated in video memory associated with the GPU. Therefore, in order to update the heat map as described above, a determination still has to be made as to which tiles have been updated.

In an embodiment, the GPU may be configured to determine the differences in pixels or regions of the bitmap between two consecutive frames. This differencing enables the GPU to determine which tiles will be potential video candidates. Once this is determined, the heat map may be generated and analyzed as discussed above. In another embodiment, the GPU may be configured to generate the entire display area including the video data and the visual data based on a series of DIRECTX commands. Once the display area has been generated, the GPU may be able to determine which pixels or region in the bitmap were updated (e.g., which regions are "hot") based on the received DIRECTX commands. Once the "hot" regions have been detected, the heat map may be generated as set forth above.

While the various embodiments have been described in the general context of program modules that execute in conjunction with an application program that runs on an operating system on a computer, those skilled in the art will recognize that the embodiments disclosed herein may also be implemented in combination with other program modules.

Generally, program modules include routines, programs, components, data structures, and other types of structures that perform particular tasks or implement particular abstract data types.

Figure 4:
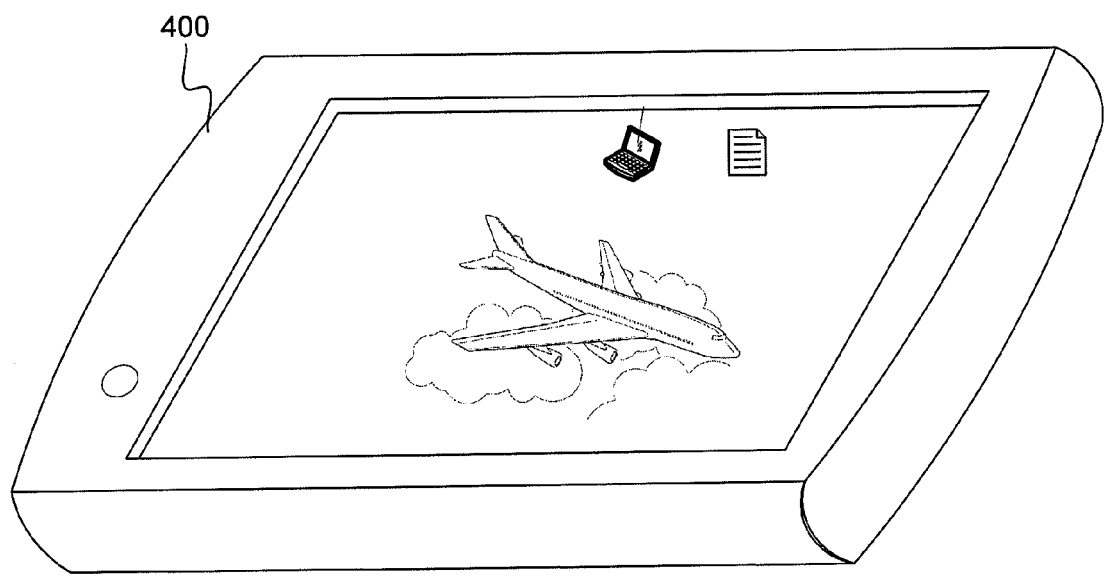
FIG. 4 illustrates a tablet computing device executing one or more embodiments disclosed herein.
Figure 5:
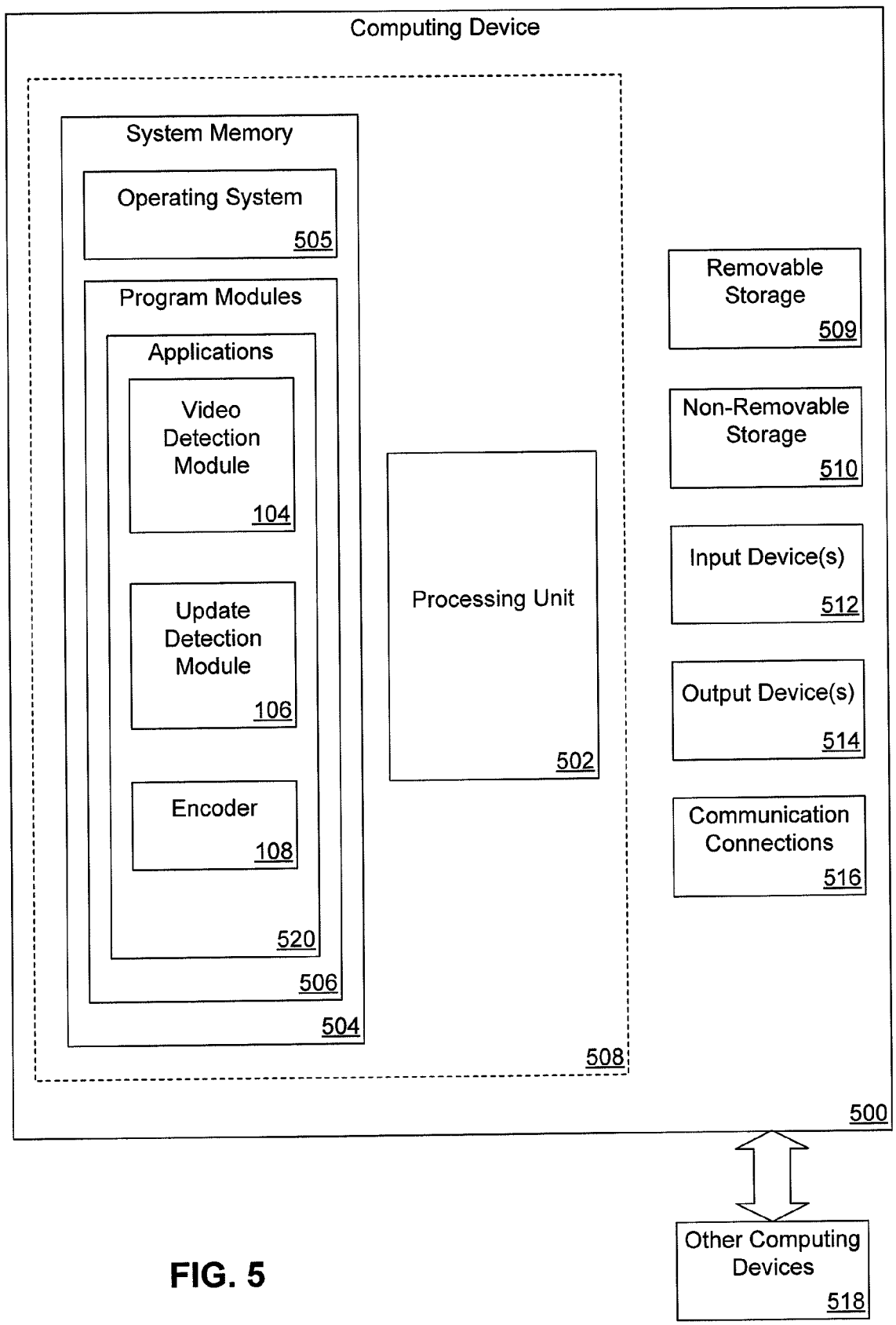
FIG. 5 illustrates a block diagram of a computing environment suitable for implementing one or more embodiments disclosed herein.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. FIG. 4 illustrates an exemplary tablet computing device 400 executing an embodiment of the video detection module 104. In another embodiment, the tablet computing device may be receiving the encoded video data generated by the video detection module 104 and the encoder 108. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 5 through 7 and the associated descriptions provide a discussion of a variety of operating environments in which embodiments of the present disclosure may be practiced. However, the devices and systems illustrated and discussed with respect to FIGS. 5 through 7 are for purposes of example and illustration and are not limiting of a vast number of computing device configurations that may be utilized for practicing embodiments of the present disclosure, described herein.

FIG. 5 is a block diagram illustrating exemplary physical components (i.e., hardware) of a computing device 500 with which embodiments of the present disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520, such as the video detection module 104, update detection module 106 and encoder 108. The operating system 505, for example, may be suitable for controlling the operation of the computing device 500. Furthermore, embodiments of the present disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506, such as the video detection module 104, update detection module 106 and encoder 108 may perform processes including, for example, one or more of the stages of the methods described herein. The aforementioned process is an example, and the processing unit 502 may perform other processes. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the video detection module 104, update detection module 106 and encoder 108may be operated via application-specific logic integrated with other components of the computing device 500 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, or serial ports, and other connections appropriate for use with the applicable computer readable media.

Embodiments of the present disclosure, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 504, the removable storage device 509, and the non-removable storage device 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 500. Any such computer storage media may be part of the computing device 500.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
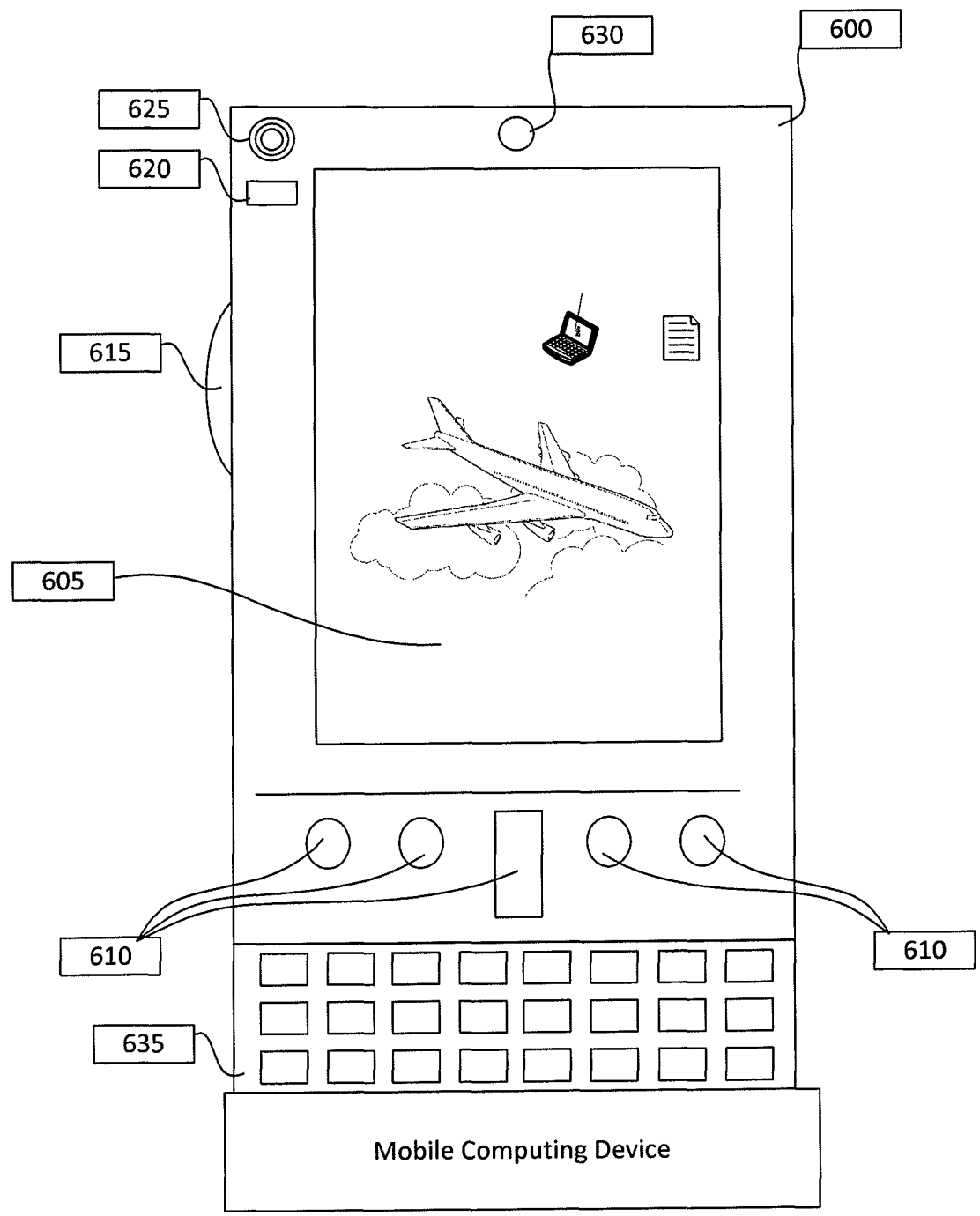
FIG. 6A illustrates one embodiment of a mobile computing device executing one or more embodiments disclosed herein.
Figure 6B:
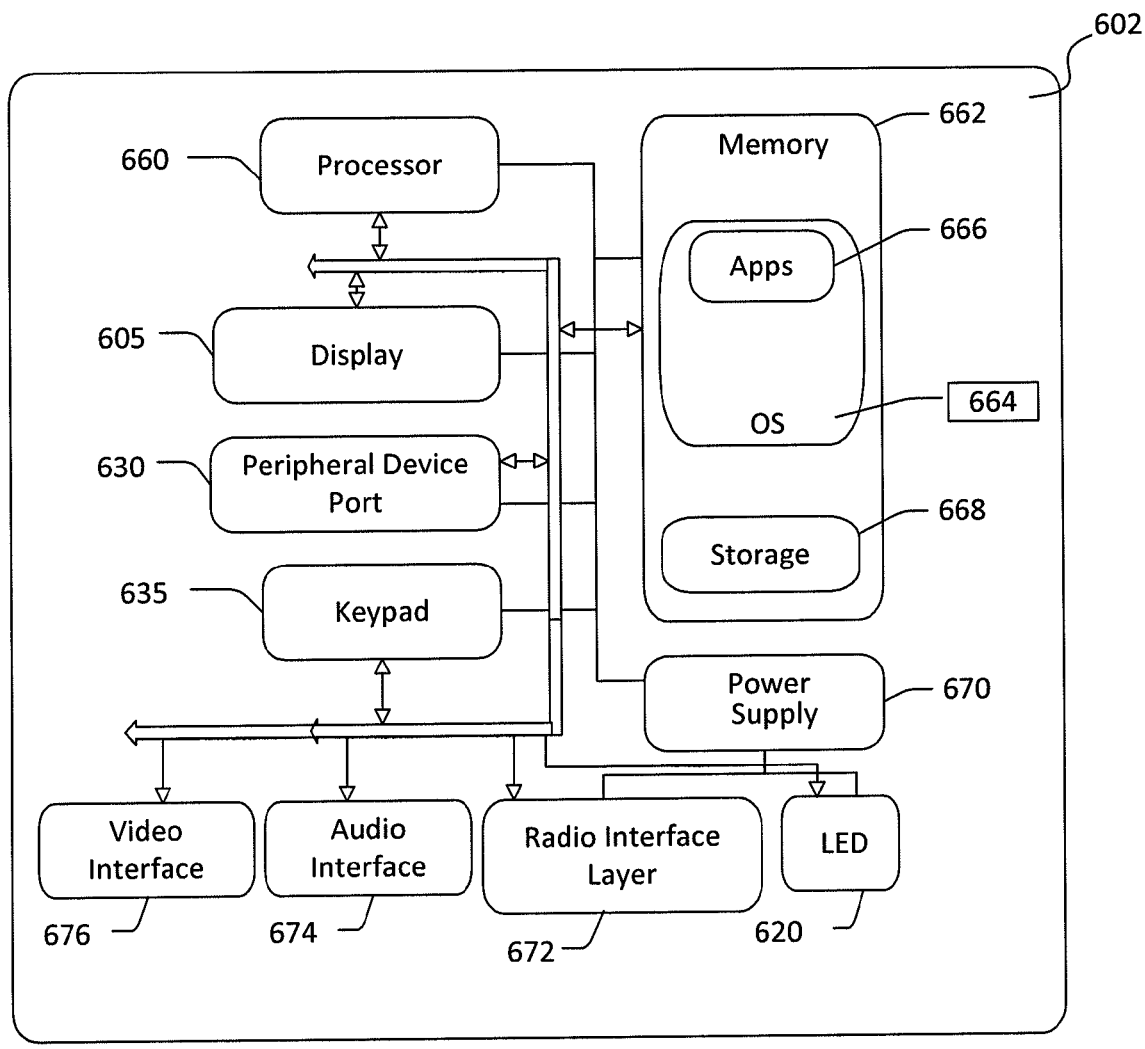
FIG. 6B is a simplified block diagram of an exemplary mobile computing device suitable for practicing one or more embodiments disclosed herein.
Figure 7:
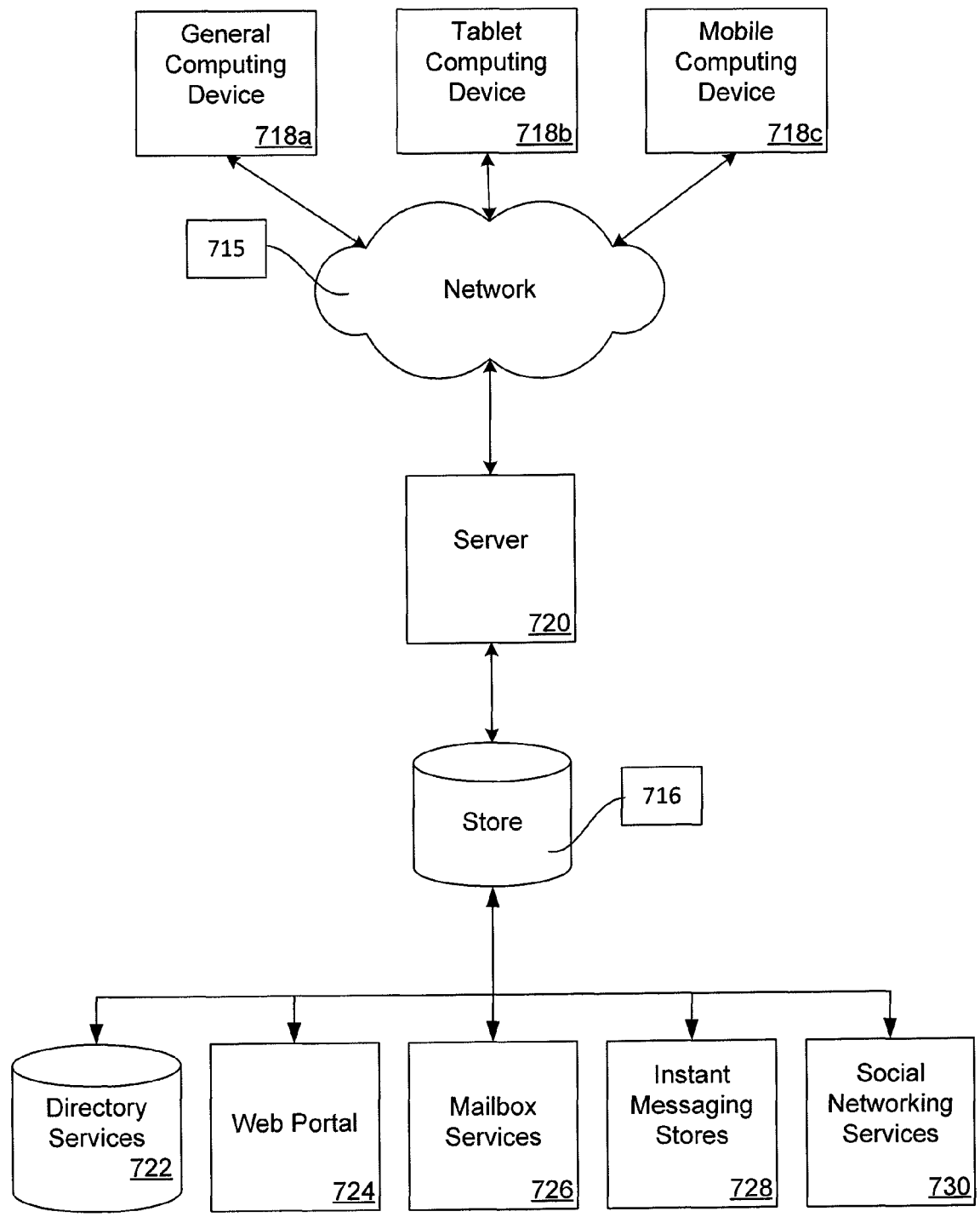
FIG. 7 is a simplified block diagram of an exemplary distributed computing system suitable for practicing one or more embodiments disclosed herein.

FIGS. 6A and 6B illustrate a mobile computing device 600, for example, a mobile telephone, a smart phone, a tablet personal computer, a laptop computer, and the like, with which embodiments of the present disclosure may be practiced. With reference to FIG. 6A, an exemplary mobile computing device 600 for implementing the embodiments is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a "smart phone" capable of running one or more applications (e.g., browser, e-mail, calendaring, contact managers, messaging clients, games, and media clients/players). In some embodiments, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the video detection module 104, the update detection module 106 and the encoder 108 described herein.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world", via a communications carrier or service provider. Transmissions to and from the radio 672 are conducted under control of the operating system 664. In other words, communications received by the radio 672 may be disseminated to the application programs 666 via the operating system 664, and vice versa.

The radio 672 allows the system 602 to communicate with other computing devices, such as over a network. The radio 672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 602 provides notifications using the visual indicator 620 that can be used to provide visual notifications and/or an audio interface 674 producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668. Computer storage media may include volatile and nonvolatile, removable and non-removable media implemented in any method or technology for storage of information, such as computer readable instructions, data structures, program modules, or other data.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one embodiment of the architecture of a system for providing the video detection module 104, the update detection module 106 and the encoder 108 to one or more client devices, as described above. Content developed, interacted with or edited in association with the video detection module 104, the update detection module 106 and the encoder 108 may be stored in different communication channels or other storage types. For example, various video data and other content may be stored using a directory service 722, a web portal 724, a mailbox service 726, an instant messaging store 728, or a social networking site 730. The video detection module 104, the update detection module 106 and the encoder 108 may use any of these types of systems or the like for enabling the functionality described herein. A server 720 may provide the video detection module 104, the update detection module 106 and the encoder 108 to clients. As one example, the server 720 may be a web server providing the video detection module 104, the update detection module 106 and the encoder 108 over the web. The server 720 may provide the video detection module 104, the update detection module 106 and the encoder 108 over the web to clients through a network 715. By way of example, the client computing device 718 may be implemented as the computing device 700 and embodied in a personal computer 718a, a tablet computing device 718b and/or a mobile computing device 718c (e.g., a smart phone). Any of these embodiments of the client computing device 718 may obtain content from the store 716. In various embodiments, the types of networks used for communication between the computing devices that make up the present disclosure include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the claims in any way. The embodiments, examples, and details provided in this application are considered sufficient to convey possession and enable others to make and use the best mode of the claimed subject matter. The claimed subject matter should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claims.

What is claimed is:

1. A method for encoding rendered data, the method comprising:
    dividing a display area having rendered data thereon into a plurality of tiles;
    determining an update frequency of the rendered data for each tile in the plurality of tiles;
    for each tile whose update frequency exceeds a threshold, marking that tile as a candidate tile;
    identifying a group of adjacent marked tiles as a heat map;
    encoding the rendered data associated with the heat map;
    tracking a position of the heat map; and
    when the heat map has moved to a different position, stopping the encoding of the rendered data associated with the heat map.

2. The method of claim 1, further comprising, encoding the rendered data associated with the heat map as video data when each tile in the heat map remains a candidate tile for a first predetermined amount of time.

3. The method of claim 2, further comprising ceasing to encode the rendered data associated with the heat map as video data when at least one tile in the heat map is not marked as a candidate tile for a second predetermined amount of time.

4. The method of claim 3, wherein the rendered data is video data and wherein the second predetermined amount of time is equivalent to a number of consecutive frames of the video data.

5. The method of claim 1, wherein the rendered data is video data.

6. The method of claim 2, wherein the first predetermined amount of time is equivalent to a predetermined number of consecutive frames of the video data.

7. The method of claim 1, wherein each of the plurality of tiles has fixed coordinates on a display area during a first predetermined period of time.

8. The method of claim 1, wherein determining an update frequency of the rendered data for each tile in the plurality of tiles comprises:
    receiving a bitmap for each update; and
    determining, based on the bitmap, the update frequency of each pixel in each tile in the plurality of tiles.

9. A computer-readable storage medium encoding computer executable instructions that, when executed by at least one processor, performs a method for encoding rendered data, the method comprising:
    dividing a display area having rendered data thereon into a plurality of tiles;
    determining an update frequency of the rendered data for each tile in the plurality of tiles;
    for each tile whose update frequency exceeds a threshold, marking that tile as a candidate tile;
    identify a group of adjacent candidate tiles;
    encoding the rendered data associated with the group of adjacent candidate tiles;
    tracking a position of the group of adjacent candidate tiles; and
    when the group of adjacent candidate tiles has moved to a different position, stopping the encoding of the rendered data associated with the group of adjacent candidate tiles.

10. The computer-readable storage medium of claim 9, further comprising instructions for encoding the rendered data associated with the group of adjacent candidate tiles when each tile in the group of adjacent candidate tiles remains a candidate tile for a first predetermined amount of time.

11. The computer-readable storage medium of claim 10, further comprising instructions for ceasing to encode the rendered data associated with the group of adjacent candidate tiles when at least one tile in the adjacent-candidate tiles is not marked as a candidate tile for a second predetermined amount of time.

12. The computer-readable storage medium of claim 11, wherein the rendered data is video data and wherein the second predetermined amount of time is equivalent to a number of consecutive frames of the video data.

13. The computer-readable storage medium of claim 9, wherein the rendered data is video data.

14. The computer-readable storage medium of claim 10, wherein the first predetermined amount of time is equivalent to a predetermined number of consecutive frames of the video data.

15. The computer-readable storage medium of claim 9, wherein each of the plurality of tiles has fixed coordinates on a display area during the first predetermined period of time.

16. The computer-readable storage medium of claim 9, wherein determining an update frequency of the rendered data for each tile in the plurality of tiles comprises:
    receiving a bitmap for each update; and
    determining, based on the bitmap, the update frequency of each pixel in each tile in the plurality of tiles.

17. A computer system comprising:
    one or more processors; and
    a memory coupled to the one or more processors, the memory for storing instructions which, when executed by the one or more processors, cause the one or more processors to perform a method for encoding rendered data, the method comprising:
        dividing a display area having rendered data thereon into a plurality of tiles;
        determining an update frequency of the rendered data for each tile in the plurality of tiles;
        for each tile whose update frequency exceeds a threshold, marking that tile as a candidate tile;
        associating adjacent marked tiles to form a heat map;
        analyzing the heat map over a first predetermined amount of time to determine whether to encode the rendered data associated with the heat map;
        encoding the rendered data associated with the heat map when each tile in the heat map remains a candidate tile for the first predetermined amount of time;
    tracking coordinates of the heat map to determine whether the heat map has been moved to a different position; and
    when the heat map has moved to a different position, stopping encoding of the heat map.

18. The computer system of claim 17, wherein the rendered data is video data and wherein the first predetermined amount of time is equivalent to a predetermined number of consecutive frames of the video data.

19. The method of claim 1, further comprising:
    when the heat map has not moved to a different position, continuing to encode the rendered data.

20. The computer storage medium of claim 9, wherein the method further comprises when the heat map has not moved, continuing to encode the rendered data.

* * * * *